A. J. Tewksbury,
Pegging Jack,
N° 18,614.  Patented Nov. 10, 1857.

UNITED STATES PATENT OFFICE.

A. J. TEWKSBURY, OF HAVERHILL, MASSACHUSETTS.

IMPROVEMENT IN LAST-HOLDERS.

Specification forming part of Letters Patent No. 18,614, dated November 10, 1857.

*To all whom it may concern:*

Be it known that I, A. J. TEWKSBURY, of Haverhill, in the county of Essex and Commonwealth of Massachusetts, have invented a new and useful Last-Holder; and I do hereby declare that the following is a full, clear, and exact description of the construction and operation of the same, reference being had to the accompanying drawings, forming a part of this specification.

Similar parts are indicated by the same letters in both figures.

Figure 1 is a vertical section, and Fig. 2 is another vertical section at right angles with that of Fig. 1, showing those parts which are not so clearly seen in the latter.

The nature of my invention consists, first, in furnishing the wedge P (which confines the lever M of the heel-pin L) with a notched spring, constructed as hereinafter described, by means of which the wedge is conveniently adjusted by hand and effectually prevented from jarring or starting out of place by the action of hammering or "rubbing down" the sole; second, in the use of a spring-bolt G for confining the ball E E in the socket A A, so that the bottom of the shoe shall be held fast in a horizontal position when hammered or rubbed, while at the same time it is free to turn in a horizontal plane on said spring-bolt as an axis, and, third, in uniting the two parts of the socket A A by means of bolt B and an elastic washer or spring C for the purpose of adjusting and giving the requisite friction between the ball and the socket without its being too great or too small, as would be apt to be the case were the two halves united by means of a rigid bolt alone.

To enable others skilled in the art to make and use my invention, I will proceed to describe its construction and operation.

A A A A are two hollow hemispherical pieces of cast-iron, forming the socket for the ball E E. It is obvious from the figures that these hemispheres when united may be confined to a bench or table by means of screws passing through the horizontal flange at the bottom.

B is a bolt passing through the lower neck of the socket, uniting the halves, as seen in Fig. 1.

C is a rubber washer or a metallic spring, the design of which has been described above.

D is the nut of bolt B.

E E is a hollow sphere forming the ball of the socket, the horizontal platform F F being cast in the same piece with it.

G is a bolt passing through a slot in wedge I, and thence through the platform F F and the ball E E for the objects specified above.

$g\ g$ is a coil-spring, the action of which, as will be seen by inspecting the figures, is to press the bolt G downward from the platform F F.

H is a pin passing through the upper end of the spring-bolt G, as seen in the figures.

I is a sliding wedge, the bottom side of which is straight and rests upon the platform F F, while the upper side is shaped as seen in Fig. 2. The inclined plane 1 2, moving under pin H, raises the bolt G or allows it to lower, according to the direction in which the sliding wedge I is moved.

$i$ is a small screw passing through a perpendicular slot in I for the purpose of keeping the latter in place.

3 4 is a round hole in the neck of the socket for receiving the lower extremity of G when required.

J is the toe-rest constructed like those in common use.

L is the heel-pin fast in the upper part K of the lever M, which turns on the pin 5 in the projecting ear of the platform.

N is a bolt for confining the toe-rest to the platform.

O is a coil-spring for raising M.

Figure 1:
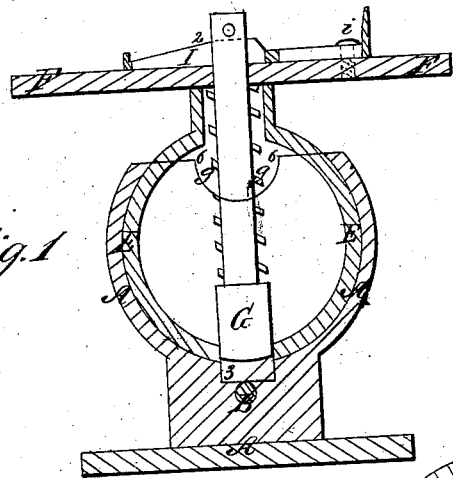
Fig. 1 represents the bolt G in the hole, and thereby confining the platform F F in a horizontal position.

P, Fig. 1, is a hollow cast-iron wedge, the upper side of which is open.

Q is a steel spring, the upper extremity of which is bent, as seen in Fig. 1, to serve as a handle for the operator, the lower extremity being fast to the apex of the wedge. The upper side of this spring is notched, as seen in the figure, and for the objects specified above.

R is a piece of steel inserted in the body of the toe-rest for the notches of the spring Q to catch upon.

Figure 2:
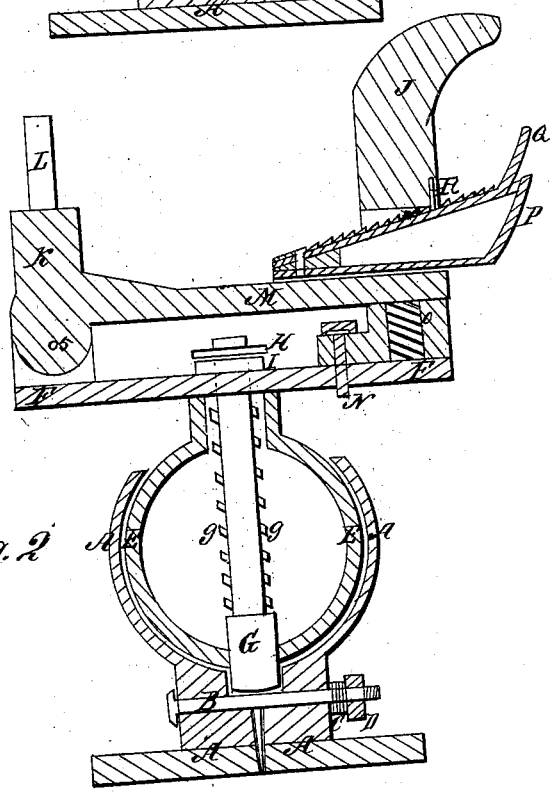
Fig. 2 represents the bolt drawn up and out of the hole and supported by the pin H and wedge I, so that the ball E E may be turned in any direction whatever.

6 6, Fig. 2, are semicircular holes on opposite sides of the socket sufficiently large to receive the neck of the ball and hold it in place whenever it is desirable to turn the platform F F so far as to be perpendicular.

What I claim as my invention, and desire to secure by Letters Patent, is—

The ball-and-socket joint A and E, in combination with the spring-bolts B and G, substantially as set forth, and for the purpose specified.

A. J. TEWKSBURY.

Witnesses:
WILLIAM TAGGART,
W. F. BARTLETT.